(12) United States Patent
Eskridge

(10) Patent No.: US 11,426,842 B2
(45) Date of Patent: Aug. 30, 2022

(54) DOUBLE-ENDED RELEASE WRENCH FOR A TIE DOWN RATCHET STRAP

(71) Applicant: Michael W. Eskridge, Yuma, AZ (US)

(72) Inventor: Michael W. Eskridge, Yuma, AZ (US)

( * ) Notice: Subject to any disclaimer, the term of this patent is extended or adjusted under 35 U.S.C. 154(b) by 468 days.

(21) Appl. No.: 16/777,677

(22) Filed: Jan. 30, 2020

(65) Prior Publication Data

US 2021/0237234 A1    Aug. 5, 2021

(51) Int. Cl.
*B25B 13/50* (2006.01)
*B60P 7/08* (2006.01)
*B25B 13/08* (2006.01)

(52) U.S. Cl.
CPC .......... *B25B 13/5033* (2013.01); *B25B 13/08* (2013.01); *B60P 7/083* (2013.01); *B60P 7/0853* (2013.01)

(58) Field of Classification Search
CPC ..... B25B 13/5033; B25B 13/08; B60P 7/083; B60P 7/0853
See application file for complete search history.

(56) References Cited

U.S. PATENT DOCUMENTS

| | | | | |
|---|---|---|---|---|
| 568,056 A | * | 9/1896 | Vail .......................... | B60P 7/083 242/396.2 |
| 621,081 A | * | 3/1899 | Hensley .................. | B60P 7/083 242/388.3 |
| 799,767 A | * | 9/1905 | Weisenborn ............ | B60P 7/083 242/388.3 |
| 1,793,714 A | * | 2/1931 | Newberg ................. | B25B 13/08 81/177.1 |
| 4,318,315 A | * | 3/1982 | Washburn ............. | B25B 13/463 81/124.2 |
| 6,092,437 A | * | 7/2000 | Sumner ................... | B60P 7/083 74/543 |

(Continued)

FOREIGN PATENT DOCUMENTS

| | | | | |
|---|---|---|---|---|
| JP | 4204629 B1 | * | 1/2009 | ............ B60P 7/0823 |
| KR | 2015002957 U | * | 7/2015 | ............. B25B 13/02 |

*Primary Examiner* — Michael E Gallion
(74) *Attorney, Agent, or Firm* — David R. Heckadon; Gordon Rees Scully Mansukhani LLP

(57) ABSTRACT

A release wrench for a tie down ratchet strap, having an elongated body with a first wrench end positioned at a first end of the elongated body, and a second wrench end positioned at a second end of the elongated body. Each of the first and second wrench ends are notched such that either end can be inserted into the rotating ratchet of a tie down ratchet strap such that rotation of the release wrench causes the rotating ratchet to move. The first wrench end extends in a direction perpendicular to the elongated body of the release wrench, and the second wrench end extends in a direction parallel to the elongated body of the release wrench. As a result, the wrench can be positioned at four different (i.e.: 90 degrees apart) positions when the release wrench is first turned to cause the rotating tie down ratchet to move. This provides a simple and effective way to "un-stick" a dirty ratchet by prying it loose. Since the release wrench can conveniently be positioned initially in one of four different orientations, the wrench can be operated in conditions where there is little clearance for hands or tools, such as underneath or around vehicle trailers or cargo containers.

3 Claims, 4 Drawing Sheets

(56) References Cited

U.S. PATENT DOCUMENTS

| | | | | |
|---|---|---|---|---|
| 6,102,637 | A * | 8/2000 | Mocci | B60P 7/083 74/544 |
| 6,398,470 | B1 * | 6/2002 | Mosley | B60P 7/0853 74/544 |
| 6,467,716 | B1 * | 10/2002 | Hamilton | B65H 75/305 410/103 |
| 6,729,604 | B1 * | 5/2004 | Claycomb | B60P 7/0846 24/69 CT |
| 6,799,751 | B1 * | 10/2004 | Anderson | B60P 7/083 24/69 ST |
| 6,824,339 | B1 * | 11/2004 | Childers | B60P 7/0846 16/110.1 |
| 7,410,334 | B2 * | 8/2008 | McGrew | B60P 7/0853 410/100 |
| 7,410,336 | B2 * | 8/2008 | Parks | B60P 7/0846 279/144 |
| 7,464,916 | B1 * | 12/2008 | Drinkhorn | B61D 45/00 74/545 |
| 8,434,979 | B1 * | 5/2013 | Genge | B61D 45/001 410/103 |
| 9,915,290 | B2 * | 3/2018 | Wilkinson | F16D 1/10 |
| 11,130,213 | B1 * | 9/2021 | Ashenbrenner | B25B 23/0007 |
| 2010/0199473 | A1 * | 8/2010 | Long | B25B 13/02 24/68 CD |
| 2011/0150595 | A1 * | 6/2011 | Foryan | B60P 7/083 254/223 |
| 2016/0069365 | A1 * | 3/2016 | Spychalski-Merle | F16L 13/02 24/68 R |
| 2016/0193982 | A1 * | 7/2016 | Wu | B60P 7/083 242/395 |
| 2017/0203680 | A1 * | 7/2017 | Mahaffey | F16G 3/006 |
| 2017/0232881 | A1 * | 8/2017 | Thompson | B60P 7/0838 254/229 |
| 2020/0254919 | A1 * | 8/2020 | Helline | B25B 13/06 |
| 2020/0284319 | A1 * | 9/2020 | Danton | F16G 11/12 |
| 2021/0229949 | A1 * | 7/2021 | Henderson | B65H 54/585 |
| 2021/0276161 | A1 * | 9/2021 | Amash | B23K 26/0876 |
| 2021/0316427 | A1 * | 10/2021 | Langhorst | B25B 23/147 |
| 2022/0009061 | A1 * | 1/2022 | Payne | B25B 13/04 |
| 2022/0055520 | A1 * | 2/2022 | Scott | B60P 7/0853 |

* cited by examiner

DOUBLE-ENDED RELEASE WRENCH FOR A TIE DOWN RATCHET STRAP

TECHNICAL FIELD

The present invention relates to tie down ratchet straps.

BACKGROUND OF THE INVENTION

Tie down ratchet straps (including those used for securing cargo, such as for use with motor vehicles or motorcycles, or other uses) can easily become clogged with dirt and do not release easily. This problem requires an operator to access the ratchet strap and unwind the bound up strapping mechanism to release the strap. In addition, such tie down ratchet straps are typically positioned at hard to reach locations which have limited clearance for the operator's hands or tools.

What is instead desired is a novel wrench that can be positioned to pry the strapping mechanism loose with the wrench itself being conveniently positioned in different orientations with respect to the ratchet. Advantageously as well, such a system would deal with situations of limited clearance in the vicinity of the ratchet and strapping mechanism, (such as underneath a trailer).

SUMMARY OF THE INVENTION

The present invention provides a release wrench for a tie down ratchet strap, comprising: a generally planar elongated body; a first wrench end positioned at a first end of the elongated body; and a second wrench end positioned at a second end of the elongated body. In preferred aspects, the first wrench end comprises a notched end in the elongated body, the second wrench end comprises a notched end in a mounting panel extending from the elongated body.

Preferably, each of the two wrench ends are symmetrical and comprise a pair of tongs separated by a centrally-located notch.

Preferably, the first wrench end is oriented perpendicular to the second wrench end with the first wrench end extending in a direction perpendicular to the elongated body of the release wrench, while the second wrench end extends in a direction parallel to the elongated body of the release wrench.

In optional preferred aspects, the first end comprises a 90 degree bend in the elongated body and the second end comprises a mounting panel extending perpendicular to the plane of the generally planar elongated body.

The present invention also provides a combined tie down ratchet strap and release wrench set, comprising: (a) a tie down ratchet strap having: a frame, a rotating ratchet mounted onto the frame, and a tie strap secured to the frame by the rotating ratchet; and (b) a release wrench having: an elongated body; a first wrench end positioned at a first end of the elongated body; and a second wrench end positioned at a second end of the elongated body.

Preferably, the first and second wrench ends are notched with a pair of tongs that are receivable into the side of the rotating strap tie down ratchet. As such, either of the first or second wrench ends are receivable into a side of the rotating ratchet, such that rotation of the release wrench causes the rotating ratchet mechanism to move.

Preferably, the first wrench end extends in a direction perpendicular to the elongated body of the release wrench, and the second wrench end extends in a direction parallel to the elongated body of the release wrench.

An advantage of the present system is that the release wrench can be positioned at four different (90 degree apart) positions when the release wrench is first turned to cause the rotating tie down ratchet mechanism to move. This provides a simple and effective way to "un-stick" a dirty ratchet mechanism by prying it loose. Since the release wrench can conveniently be positioned initially in one of four different orientations, the wrench can be operated in conditions where there is little clearance for hands or tools, such as underneath or around vehicle trailers or cargo containers.

DETAILED DESCRIPTION OF THE DRAWINGS

Figure 1:
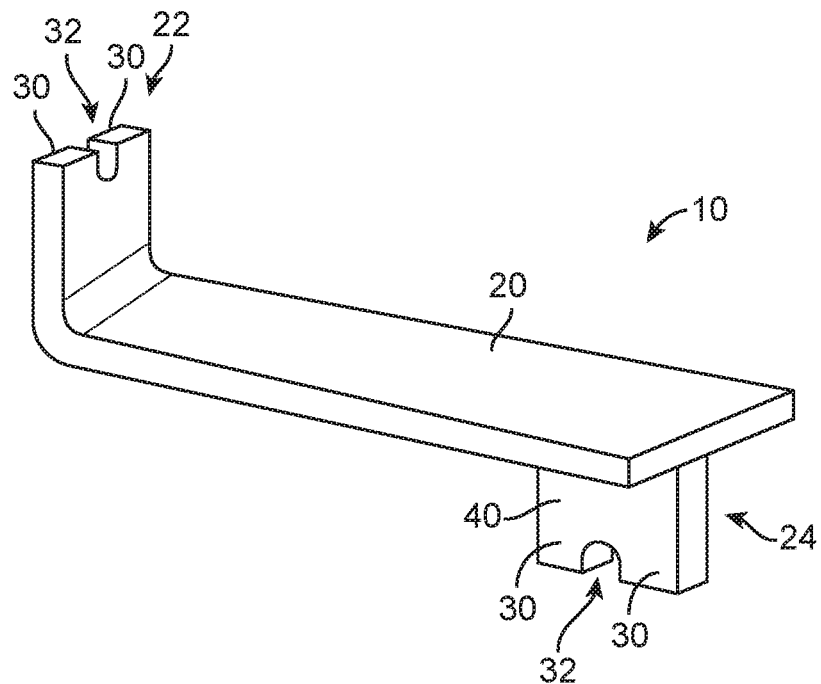
FIG. 1 is a perspective view of the present release wrench.
Figure 2:
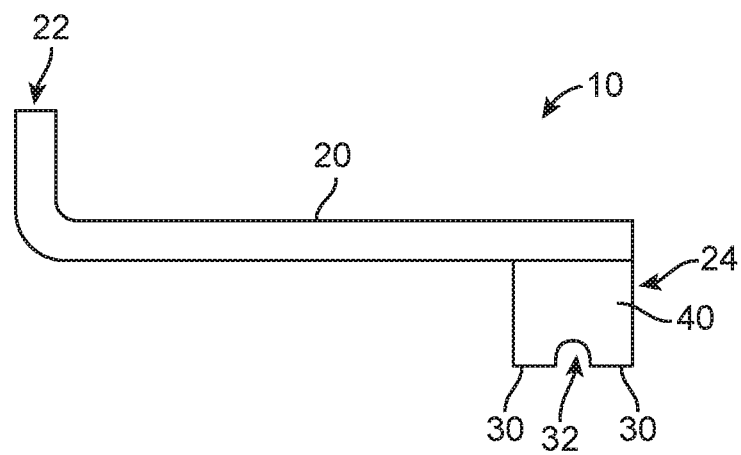
FIG. 2 is a side elevation view of the present release wrench.
Figure 3:
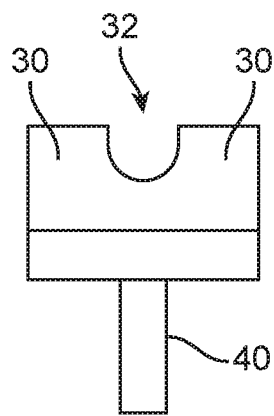
FIG. 3 is a front elevation view of the present release wrench.
Figure 4:
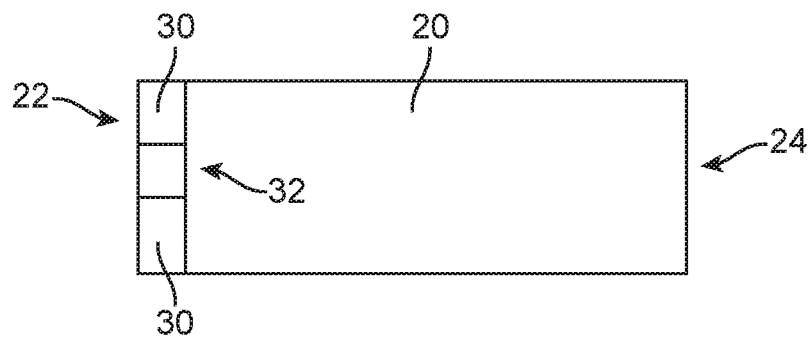
FIG. 4 is a top plan view of the present release wrench.
Figure 5:
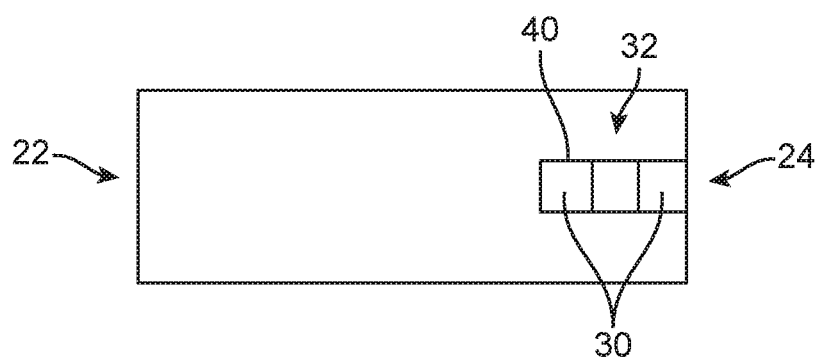
FIG. 5 is a bottom plan view of the present release wrench.

FIGS. 1 to 5 show various view of the present release wrench 10, as follows. Release wrench 10 comprises: an elongated body 20; a first wrench end 22 positioned at a first end of elongated body 20, and a second wrench end 24 positioned at a second end of elongated body 20.

The first wrench end 22 comprises a notched end of the elongated body, and the second wrench end 24 also comprises a notched end of the elongated body. As can be seen, each of the two wrench ends 22 and 24 comprise a pair of tongs 30 separated by a centrally-located notch 32. As can also be seen, each of the two wrench ends 22 and 24 are symmetrical from one side to another.

The first wrench end 22 is oriented perpendicular to the second wrench end 24. In addition, the first wrench end 22 extends in a direction perpendicular to the elongated body of the release wrench, whereas the second wrench 24 end extends in a direction parallel to the elongated body 20 of release wrench 10.

Elongated body 20 is preferably generally planar (as shown); however, other shapes and dimensions (including but not limited to rectangular or circular cross sections) are also contemplated, all keeping within the scope of the present invention. In optional preferred embodiments, elongated body 20 is generally planar and the first end 22 comprises a 90 degree bend in the elongated body. In this preferred embodiment, the second end 24 comprises a mounting panel 40 extending perpendicular to the plane of generally planar elongated body 20. Specifically, the 90 degree bend at first end 22 may simply be a bend in a direction perpendicular to the plane of the generally planar elongated body 20, as shown.

Figure 6:
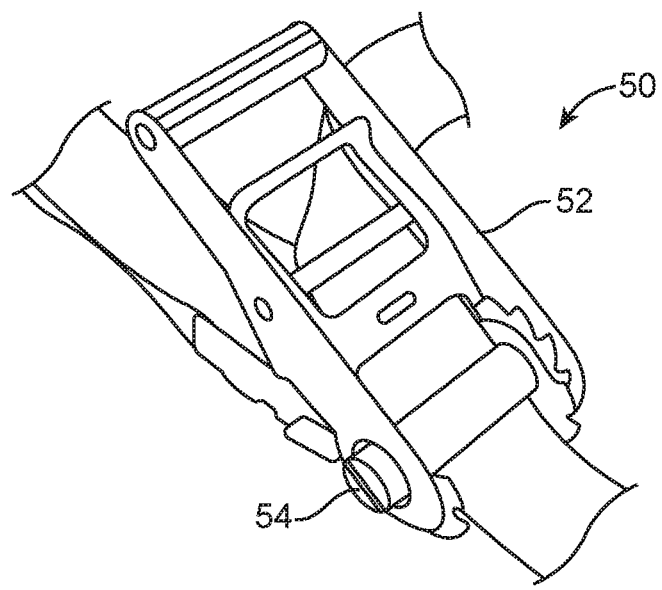
FIG. 6 is a perspective view of a standard tie down ratchet strap.
Figure 7:
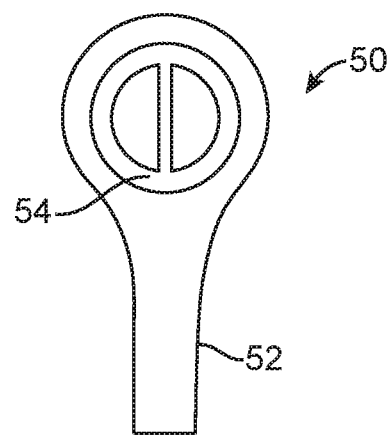
FIG. 7 is a side elevation view of the standard tie down ratchet strap of FIG. 6.

FIG. 6 is a perspective view of a standard tie down ratchet strap, and FIG. 7 is a side elevation view of the standard tie down ratchet strap of FIG. 6.

In various aspects, the present invention also provides a combined tie down ratchet strap and release wrench set, comprising: (a) a tie down ratchet strap 50 comprising: a frame 52, a rotating ratchet 54 mounted onto frame 52, and a tie strap 56 secured to frame 52 by rotating ratchet 54; and (b) a release wrench 10 comprising: an elongated body 20; a first wrench end 22 positioned at a first end of elongated body 20; and a second wrench end 24 positioned at a second end of elongated body 20.

Figure 8:
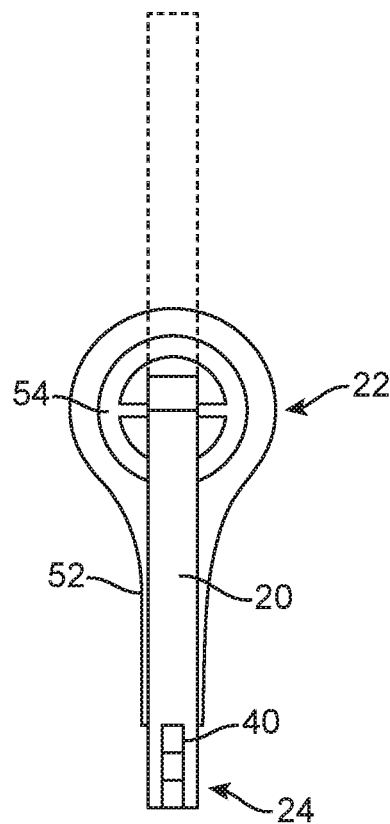
FIG. 8 is a view corresponding to FIG. 7, but with the first end of the present release wrench received into a side of a rotating ratchet in the standard tie down ratchet strap.
Figure 9:
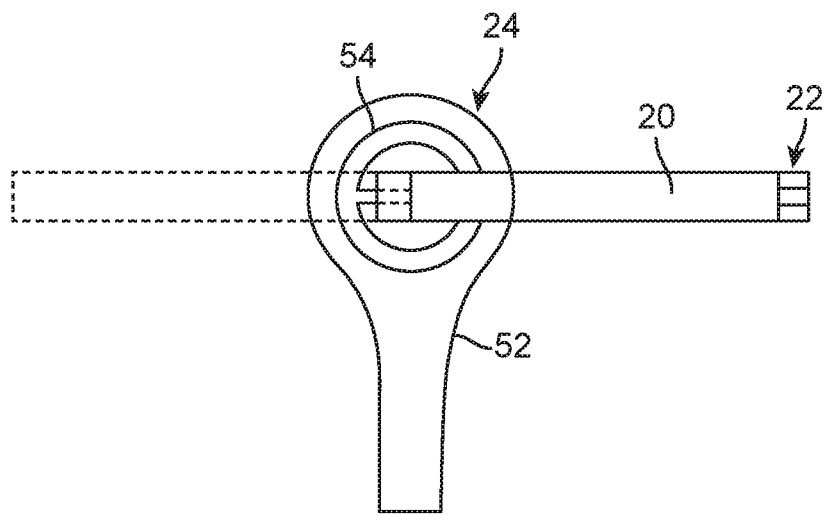
FIG. 9 is a view corresponding to FIG. 7, but with the second end of the present release wrench received into a side of a rotating ratchet in the standard tie down ratchet strap.

In operation, either of the first or second wrench ends 22 or 24 are receivable into a side of the rotating ratchet 54, such that rotation of release wrench 10 causes the rotating ratchet 54 to move. For example, FIG. 8 is a view corresponding to FIG. 7, but with the first end 22 of the release wrench 10 received into a side of rotating ratchet 54 of tie down ratchet strap 50. FIG. 9 is a view corresponding to FIG. 7, but with the second end 24 of the release wrench 10 instead received into a side of rotating ratchet 54 of tie down ratchet strap 50. As can be seen by comparing FIGS. 7 and 8, release wrench 10 can be positioned into one of two positions that are 90 degrees apart from one another at the initial moment release wrench 10 is first inserted into the side of rotating ratchet 54.

As can also be appreciated, the release wrench 10 may instead be positioned in the positions shown in dotted lines in FIG. 8 or 9 such that there are actually four initial positions for inserting release wrench 10 into rotating ratchet 54. This provides four different arcs of curvature when loosening rotating ratchet 54. As such, ample space can be provided for the operator's hands when operating release wrench 10 in cramped conditions such as underneath the vehicle.

What is claimed is:

1. A combined tie down ratchet strap and release wrench set, comprising:
   a tie down ratchet strap comprising:
      a frame,
      a rotating ratchet mounted onto the frame, and
      a tie strap secured to the frame by the rotating ratchet; and
   a release wrench comprising:
      an elongated body;
      a first wrench end positioned at a first end of the elongated body; and
      a second wrench end positioned at a second end of the elongated body,
   wherein at least one of the first or second wrench ends are receivable into a side of the rotating ratchet, and wherein rotation of the release wrench causes the rotating ratchet to move; wherein the first and second wrench ends are notched with a pair of tongs that are receivable into the side of the rotating ratchet.

2. The release wrench of claim 1, wherein the elongated body is substantially planar.

3. The set of claim 2, wherein:
   the first end comprises a 90 degree bend in the elongated body in a bend in a direction perpendicular to the plane of the substantially planar elongated body of the release wrench, and
   the second end comprises a mounting panel connected perpendicular to the elongated body of the release wrench.

* * * * *